United States Patent

[11] 3,597,534

[72] Inventors Carl-Erik Granqvist
Lidingo;
Nils Arvid Norman Bjork, Taby, both of, Sweden

[21] Appl. No. 813,836
[22] Filed Apr. 7, 1969
[45] Patented Aug. 3, 1971
[73] Assignee AGA Aktiebolag
Lidingo, Sweden
[32] Priority Apr. 11, 1968
[33] Sweden
[31] 4991/68

[54] SYSTEM FOR DISPLAYING THE DISTRIBUTION OF THERMAL RADIATION FROM AN OBJECT
2 Claims, 3 Drawing Figs.

[52] U.S. Cl. .......................................... 178/6.8, 178/DIG. 6, 178/DIG. 8
[51] Int. Cl. .......................................... H04n 7/18
[50] Field of Search .......................................... 178/DIG. 6, DIG. 8, 6.8

[56] References Cited

UNITED STATES PATENTS

| | | | |
|---|---|---|---|
| 2,490,561 | 12/1949 | Ussler, Jr. .................... | 178/7.1 |
| 3,214,515 | 10/1965 | Ebberline .................... | 178/6.8 |
| 3,441,667 | 4/1969 | Novacek .................... | 178/6.8 |

*Primary Examiner*—Robert L. Griffin
*Assistant Examiner*—Richard K. Eckert, Jr.
*Attorney*—Larson, Taylor and Hinds

ABSTRACT: An infrared scanning device creates a video signal representing the strength of infrared radiation from successively scanned points of an object. A modified signal, for instance, indicating when the radiation strength is within a predetermined range, is derived, and the video signal and the modified signal are applied to a reproducing device of the cathode-ray type alternatively so as to be displayed on separate portions of the image target.

SYSTEM FOR DISPLAYING THE DISTRIBUTION OF THERMAL RADIATION FROM AN OBJECT

BACKGROUND OF THE INVENTION

The invention relates to scanning systems which respond to the infrared radiation from an object and generate a video signal of the well-known television type which represents the strength of the radiation from successively scanned points of the object. The video signal is applied to an image-reproducing device, such as a cathode-ray tube, which scans a target in synchronism with the scanning of the object and the cathode-ray beam of which is controlled to have its intensity proportional to the strength of the radiation.

It is known from Swedish Pat. No. 217,604 to generate an "isothermal" signal which indicates when the video signal is within a predetermined amplitude range. Other types of modified signals may be derived from the video signal to yield additional information with regard to the distribution of the thermal radiation. It is also known to provide a switch, by means of which either the video signal or the isothermal signal can be applied to the reproducing device, Such a switch makes it possible to observe alternatively the ordinary distribution image and the modified isothermal image, however it may be difficult to locate a certain point of the isothermal image relative to the normal image.

SUMMARY OF THE INVENTION

According to the invention, the video signal and the modified signal derived therefrom are applied to the reproducing device alternatively in such a way as to appear on different portions of the image target thereof. This facilitates substantially the location of a certain point of the modified image relative to the normal image. The portions referred to may be horizontal strips comprising a number of lines or they may be rectangular areas, the position of which is adjustable, and which may be provided in any desired number.

THE DRAWING

The invention will be described in more detail with reference to the attached drawing, in which FIG. 1 shows an embodiment of the invention, FIG. 2 is a graph illustrating the operation, and FIG. 3 a modified form of the portion to the left of the terminals A, B, C, D in FIG. 1

DESCRIPTION OF PREFERRED EMBODIMENTS

Figures 1, 2, 3:
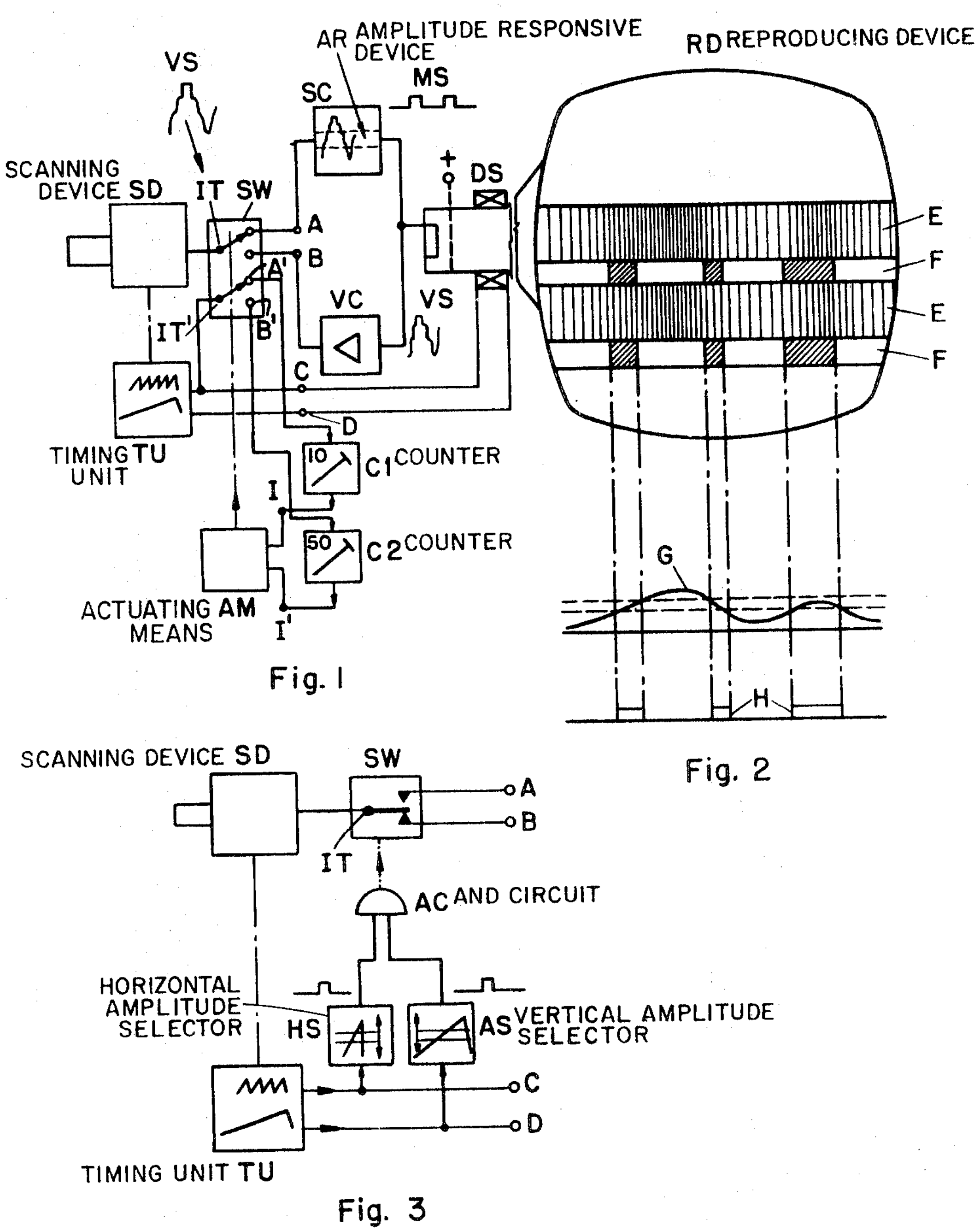

In FIG. 1, SD is a scanning device which responds to infrared radiation and is capable of scanning an object in two mutually perpendicular directions to form a scanning raster of the well-known television type. The invention is equally applicable to a scanning device for only linear cathode-ray in one dimension. SD produces a video signal VS similar to a television signal but representing, in this case, the strength of thermal radiation from successively scanned points of the object. Connected to the output of SD is an input terminal IT of a two-way switch SW, which may connect IT with either one of a pair of secondary terminals A, B. B is connected to the input of a video channel VC, which may be an amplifier for the video signal, and the output of which is connected to the cathode of an image-reproducing device RD comprising a cathode-ray tube as ordinarily used in television and having a deflecting system DS to which are applied horizontal and vertical deflecting currents of the well-known sawtooth type. A timing unit TU is synchronized with SD and derives the horizontal and vertical deflecting currents at output terminals C and D, respectively, which are in turn connected to corresponding windings of DS.

Terminal A is connected to the input of a second channel, SC, which comprises an amplitude responsive stage for deriving a modified signal MS, which indicates when the video signal VS is within a predetermined amplitude range AR. The output circuit of SC is connected to the cathode of RD.

An actuating means AM is provided to actuate SW into one or the other of its two positions and comprises a pair of inputs I and I' which are connected to the outputs of a pair of counters C1 and C2, respectively, the inputs of which are connected to auxiliary terminals A' and B' provided in SW. Also provided in SW is an auxiliary input terminal IT' which is connected to either A' or B', depending on the position of SW. IT' is connected to the horizontal output C of TU.

Operation of FIG. 1 System

With SW in the position shown, the modified signal MS is applied to RD while the first counter C1 is counting the number of horizontal sawtooth waves. C1 counts up to 10 and then gives off an input pulse to I, which causes SW to switch to position B, B'. This starts counter C2, which counts up to 50, after which it gives off an output pulse to I', causing the switch to return to the position A, A', and so on.

In the position A, A', the modified signal MS is applied to the tube. This operation extends over the time required for C1 to count 10 lines. These 10 lines are represented as an horizontal strip F in FIG. 1.

In the position B, B', the normal video signal VS is applied and on the corresponding portion E of the target there is shown the whole gamut of grey tones.

For simplicity, the drawing represents the case where all the horizontal lines have the same distribution of radiation strength. This corresponds to the scanning of an area in which the radiation intensity does not vary in the vertical direction but only in the horizontal. Normally, of course, there will be variations from line to line both within E and within F.

In FIG. 2, G is a graph to indicate the variation in intensity along one of the lines of E, and H is a similar graph for one of the lines of F. Both graphs represent the intensity of the cathode-ray beam as it scans along the line and it is shown how H is present only when the intensity is within a predetermined amplitude range.

FIG. 3

FIG. 3 is a modified version of the portion of the circuit to the left of terminals A, B, C, D. In this embodiment, switch SW is responsive to an AND circuit AC. In the inoperative position, the input terminal IT is connected to B, and in the operative position to A.

AC has two inputs, one of which is connected to an amplitude selector AS which responds to the vertical deflection current within a predetermined amplitude range in a similar manner as does SC to the video signal VS. HS is a similar amplitude selector which responds to the horizontal deflection current. The outputs of AS as well as HS are applied to AC whereby SW will be in the operative position when, and only when both the horizontal and the vertical deflection current are within corresponding predetermined amplitude ranges. AS and HS can be adjustable to make possible selection of any desired position for the upper and the lower limit, separately or jointly, of each of the amplitude ranges. In this manner, a rectangular portion of the surface will display the modified signal and the position as well as the size thereof can be varied by adjustment of AS and HS.

We claim:

1. A reproducing system for a video signal representing the strength of the thermal radiation from successively scanned points of an object, comprising: a scanning device for scanning the object in two mutually perpendicular directions and for producing, in accordance therewith, an output representing the strength of the thermal radiation from successively scanned points of the object, a two-position switch for connecting the output of said scanning device to one of first and second output terminals, an image-reproducing device for scanning a target in synchronism with the scanning of the object by said scanning device, a video channel connected between said first output terminal and said image-reproducing device, a second channel, connected between said second output terminal and said image-reproducing device, for deriving a modified signal from the output produced by said scanning device, a timing unit for generating horizontal and vertical deflecting voltages for said image-reproducing device, electrical counters connected to said timing unit and responsive to said horizontal deflecting voltages, and actuating means responsive to the output of said counters for operating said switch such that the output of said scanning device is applied to the image-reproducing device during predetermined horizontal scanning sweeps and the modified signal is applied to said image-reproducing device during further horizontal scanning sweeps.

2. A reproducing system as claimed in claim 1 wherein said second channel derives said modified signal responsive to the output of said scanning device being within a predetermined amplitude range.